UNITED STATES PATENT OFFICE.

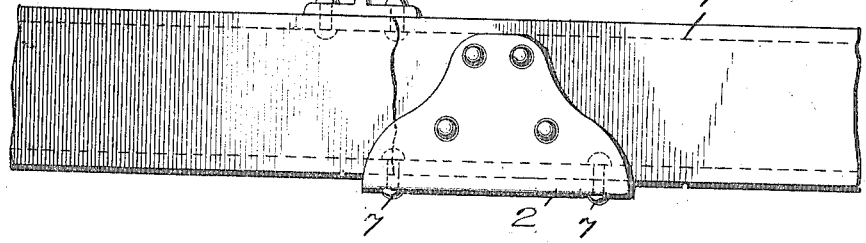
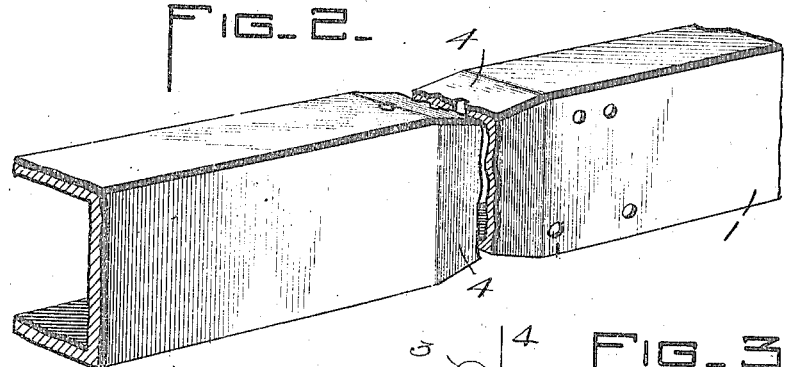
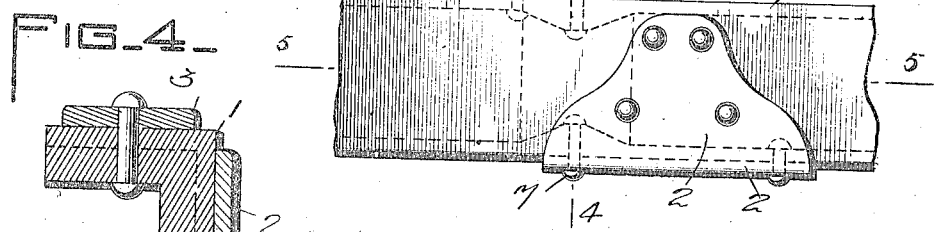
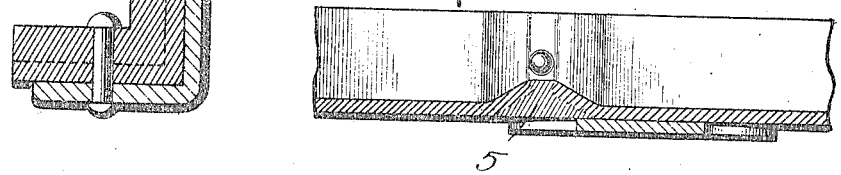

CHARLES HENRY BROWN, OF EL PASO, TEXAS.

METHOD OF WELDING.

1,263,739.   Specification of Letters Patent.   Patented Apr. 23, 1918.

Application filed December 16, 1916.   Serial No. 137,333.

*To all whom it may concern:*

Be it known that I, CHARLES H. BROWN, a citizen of the United States, and a resident of El Paso, in the county of El Paso and State of Texas, have invented an Improvement in Methods of Welding, of which the following is a specification.

My invention is an improvement in methods of welding in inaccessible places, as, for instance, in motor trucks and the like, wherein the break is in such position that it is not accessible from the inside, and wherein the outer face of the frame must be straight and smooth, and the method consists in bending in the broken ends, and welding them together and in afterward filling in the gutter formed at the bent in portions flush with the outer face of the frame.

In the drawings:

Figure 1 is a side view of a portion of a motor truck frame showing the break.

Fig. 2 is a perspective view showing the first step of the method.

Fig. 3 is a side view showing the completion of the welding.

Figs. 4 and 5 are sections on the lines 4—4 and 5—5, respectively, of Fig. 3.

In repairing a break in a broken frame, the reinforcing or welding must be from the inner side, in order that said weld or reinforcement will not be unsightly, and in portions of the frame where the inner side is inaccessible, as, for instance, in Fig. 1, wherein a portion of the main frame 1 is shown broken at the spring hanger 2 and at the bracket 3, and the sub-frame prevents access to the inside or channel of the frame to build up and reinforce in the ordinary manner. Furthermore, the outer side must be smooth and straight on its outside surface, and the only manner in which the break could be mended by such building up and reinforcing on the inside would be to dismantle the truck.

In the present method, however, a portion of the frame on each side of the break is bent inwardly obliquely, as shown at 4. The weld indicated at 5 may now be made on the outside, the species of gutter formed by the bending in of the portions 4 of the frame being filled with the welding metal flush with the outer face of the frame. The space between the broken ends is also filled, as shown more particularly in Fig. 5, and the rivets 6 and 7, which connect the bracket 3 and the hanger 2 to the frame, are passed through the reinforce or weld of the parts.

With this method of repairing, the vibrations of the frame due to road work are less likely to affect the weld, inasmuch as the line of the weld is at an angle to the path of vibrations, while the reinforcement is in a direct line and readily carries or absorbs the vibration. This method also makes the placing and riveting or welding of an additional channel or other reinforcement at the welded point unnecessary as the welded part is stronger than a new one and also it avoids the breaking of the frame at such points as the ends of the reinforcement pieces would stop at, due to excessive rigidity of the frame from the old style of reinforcement.

If desired, the frame may be welded at the break shown in Fig. 1, and afterward driven in and reinforced outside. Only an ordinary oxy-acetylene outfit and common hand tools are necessary to do the work.

I claim:

A method of welding and reinforcing broken channel frames, which consists in bending the broken ends inwardly toward the channel and abutting them to provide a gutter on the outer surface of the channel frame, and in welding the ends and in filling the gutter with the welding material flush with the faces of the frame.

CHARLES HENRY BROWN.

Witnesses:
W. B. MARTIN,
JOHN S. DUNN.